United States Patent [19]

Brown et al.

[11] Patent Number: 5,702,599
[45] Date of Patent: Dec. 30, 1997

[54] OIL FILTER COVER

[76] Inventors: Terry S. Brown, 1216 Cedar Tree La., Tampa, Fla. 33584; Robert E. Holland, 2021 Art Museum Dr., Jacksonville, Fla. 32207

[21] Appl. No.: 545,343

[22] Filed: Oct. 19, 1995

[51] Int. Cl.$^6$ ................................................ B01D 27/00
[52] U.S. Cl. ................................................ 210/248; 210/443
[58] Field of Search ................................ 210/248, 251, 210/DIG. 17, 443, 453, 454; 220/694, 729, 730, 288, 327, 328

[56] References Cited

U.S. PATENT DOCUMENTS

| | | | |
|---|---|---|---|
| 3,044,475 | 7/1962 | Thompson | 134/102 |
| 4,507,199 | 3/1985 | Carlisle | 210/238 |
| 4,574,972 | 3/1986 | Saha | 220/254 |

Primary Examiner—Matthew O. Savage
Attorney, Agent, or Firm—Dorothy S. Morse, Esq.; American Innovations, Inc.

[57] ABSTRACT

A cover for use in blocking the openings in disposable oil filters for protection of the interior surfaces of new disposable oil filters from outside contamination and also for containment of residual oil within used disposable oil filters to prevent leakage of the used oil therefrom. The protective cover has a coverplate and a knob located on the upper surface thereof for attaching and removing the protective cover from a disposable oil filter. The protective cover may also have external threads on the perimeter of the coverplate for mating with internal threads on the disposable oil filter, an externally threaded inner shaft depending from the lower surface of the coverplate, a fixed or free-spinning knob, and studs for additional security in covering the openings located through the outer surface of the disposable oil filter.

2 Claims, 2 Drawing Sheets

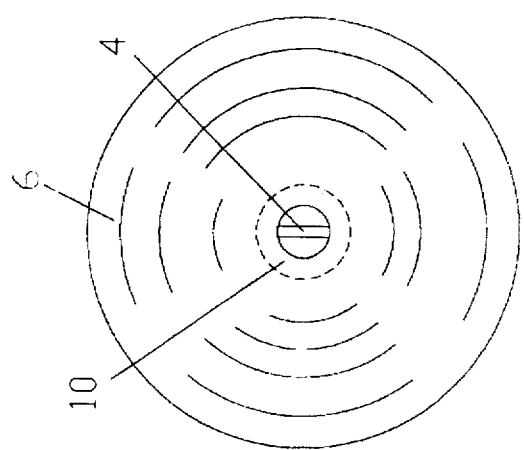
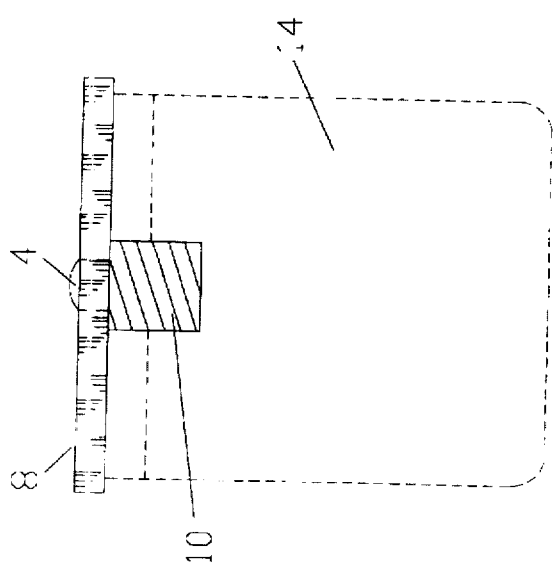
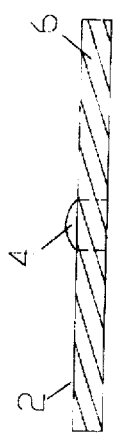
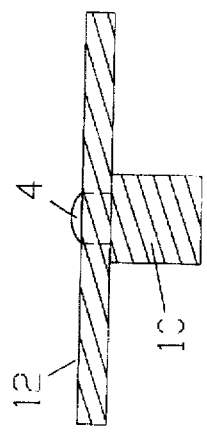

OIL FILTER COVER

BACKGROUND

1. Field of Invention

This invention relates to protective covers, specifically to a cover for use over the openings in a disposable oil filter to protect its interior surfaces when new and to prevent oil from leaking from those openings after the disposable oil filter has been used.

2. Description of Prior Art

People are becoming increasingly concerned about protection of the environment. Oil is one product that is of concern, as it is known to adversely affect the environment when disposed of improperly. Whereas it was once discarded, used oil is now considered a recoverable resource that should be recycled. Therefore, people are now encouraged to take used oil, including that which has been drained from an engine during an oil change, to commercial establishments for recycling. Specially designed oil drain pans are available to simplify the process.

On the contrary, the used oil in a replaced disposable oil filter is not as easily handled. As part of their functional design, conventional disposable oil filters have openings extending through their outer covers on one end so that the oil in an engine may circulate into their oil filtering material during use. After the disposable oil filter is removed from the engine, used oil may spill from these openings unless the used oil is drained from the oil filter, or the openings are blocked in some way to stop the flow of oil, before the used oil filter is discarded. Even many well meaning people are too impatient to permit all of the used oil to drain from a disposable oil filter before discarding it. Therefore, unless the disposable oil filter is capped, the residual oil in the disposable oil filter is likely to leak into the environment. While the residual oil from one disposable oil filter may seem insignificant, many engines are used every day, and since they all need periodic oil filter changes, the adverse cumulative effect on the environment of the residual oil in all of those disposable oil filters must be taken into account. It is therefore desirable, but not yet known to have a cover for use over the openings in a disposable oil filter to prevent oil from leaking out of those openings after the disposable oil filter has been used.

SUMMARY OF INVENTION—OBJECTS AND ADVANTAGES

It is the primary object of this invention to provide a cover for the openings in a used disposable oil filter which will block the potential leakage of residual oil contained therein so that the used oil will not have a chance to adversely affect the environment. It is a secondary object of this invention to provide a cover to protect the interior of a new disposable oil filter prior to use. It is also an object of this invention to provide a cover which will securely attach to a conventional disposable oil filter. It is a further object of this invention to provide a cover for a disposable oil filter that is simple and convenient to use.

As described herein properly manufactured and installed on a disposable oil filter. The present invention would provide a means for protecting the interior of the disposable oil filter prior to use. The present invention would also provide a means for retaining residual used oil within a used disposable oil filter so that it will not adversely affect the environment. Threads on a coverplate, or on an inner shaft depending from the coverplate, provide for secure attachment of the present invention to a disposable oil filter. Studs attached to the coverplate, for covering the openings exposed through the outer surface of a used disposable oil filter, offer additional protection against leakage of used oil from the used disposable oil filter after discard. A free-spinning center knob makes the present invention quickly removable from a disposable oil filter and easy to use.

The description herein provides preferred embodiments of the present invention but should not be construed as limiting the scope of the oil filter cover invention. Variations in size and shape of the center knob, the length of the inner shaft, the configuration of the studs, the size of the coverplate, and the number and placement of the threaded portions, other than those shown and described herein, can be incorporated into the present invention. Thus the scope of the present invention should be determined by the appended clams and their legal equivalents, rather than the examples given.

BRIEF DESCRIPTION OF THE DRAWINGS

FIG. 1 is a side view of a first embodiment of the invention having external threads on the outer perimeter of the coverplate.

FIG. 2 is a side view of a second embodiment of the invention having an inner shaft and external threads on both the outer perimeter of the coverplate and the inner shaft.

FIG. 3 is a side view of a third embodiment of the invention having external threads on the inner shaft.

FIG. 4 is a top view of the invention showing the coverplate and knob.

DETAILED DESCRIPTION OF PREFERRED EMBODIMENTS

Figure 5:
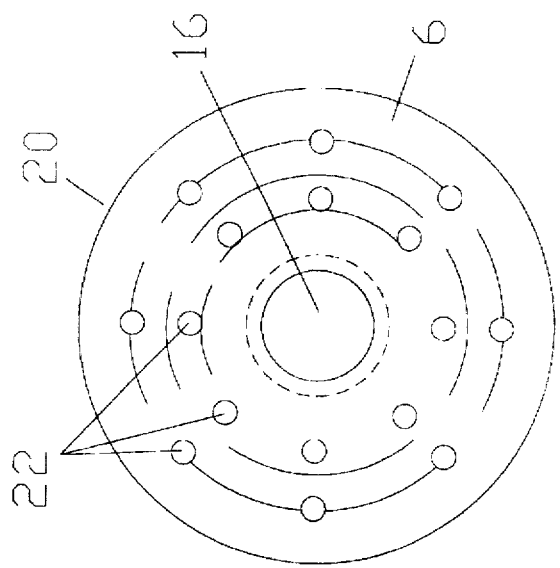
FIG. 5 is a top view of a fourth embodiment of the invention having a stationary cover and a free-spinning knob.

FIGS. 1, 2, 3, and 4 show several preferred embodiments of an oil filter cover invention 2 having a coverplate 6 and a knob 4. In FIGS. 1, 2, 3, and 4, knob 4 is permanently attached to the outside surface of coverplate 6 and does not rotate relative to coverplate 6. Knob 4 is used to screw oil filter invention 2 into, and remove oil filter invention 2 from, the open end of an oil filter 14 (shown in FIG. 3). The material from which coverplate 6 and knob 4 are made are not critical to oil filter invention 2. Coverplate 6 and knob 4 may be made out of identical or different materials. In these preferred embodiments, it is contemplated for coverplate 6 and knob 4 to be made out of plastic. However, to provide a reduced production cost, it is contemplated for oil filter invention 2 to be constructed as a one-piece, molded unit from a single material.

FIG. 1 shows a first embodiment of oil filter invention 2 wherein coverplate 6 has external threads on its outer perimeter for attachment to an oil filter 14 (shown in FIG. 3). FIG. 2 shows a second embodiment of oil filter invention 2 which, in addition to coverplate 6 having external threads on its perimeter, also has an inner shaft 10 depending from the surface of coverplate 6 remote from knob 4. External threads are present on the outside surface of inner shaft 10. FIG. 3 shows a third embodiment of oil filter invention 2 in which external threads are only present on inner shaft 10. FIG. 4 shows the central location of knob 4 on the surface of coverplate 6.

Figure 6:
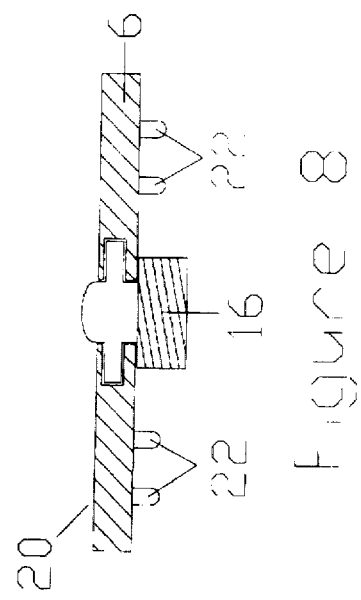
FIG. 6 is a side view of the fourth embodiment of the invention.
Figure 7:
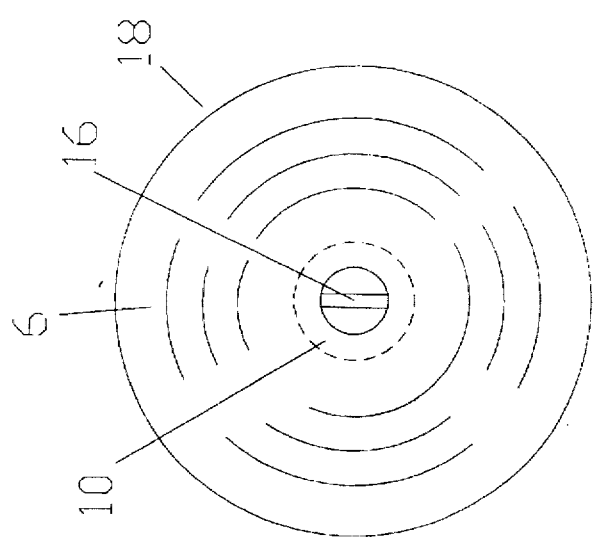
FIG. 7 is a top view of a fifth embodiment of the invention having studs to cover oil holes in a used disposable oil filter.
Figure 8:
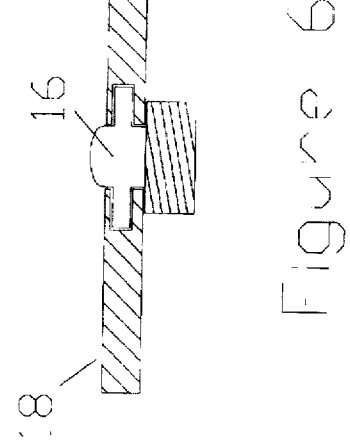
FIG. 8 is a side view of the fifth embodiment of the invention.

FIGS. 5, 6, 7, and 8 show oil filter cover invention 2 having a one-piece, knob and inner shaft unit 16 located in an aperture extending through the surface of coverplate 6, which rotates relative to coverplate 6. An inner shaft is rigidly and non-rotatably connected to the free-spinning knob. The inner shaft includes an internal portion disposed within the aperture and an external portion extending from the aperture and disposed adjacent a first surface of the cover. Connection means for connecting the freespinning knob and the inner shaft to the cover-plate are provided. The connecting means includes a circumferentially extending groove formed on an inner peripheral surface of the aperture and a flange rigidly and non-rotatably connected to the internal portion of the inner shaft, wherein the flange extends circumferentially about and radially outwardly from the internal portion of the inner shaft and extends into the groove so that the connecting means permits rotation of the inner shaft within the aperture and substantially prevents axial displacement of the inner shaft from the aperture. A plurality of external threads are provided on the external portion of the inner shaft for mating with at least some of the internal threads on the disposable oil filter so that the coverplate may be securely attached to said oil filter to prevent oil from leaking from said openings and adversely affecting the environment after disposal. FIG. 5 shows rotating knob and inner shaft unit 16 being centrally located on coverplate 6. FIG. 6 shows external threads on the perimeter of coverplate 6 and on the inner shaft portion of knob and inner shaft unit 16. FIG. 7 shows studs 22 attached to coverplate 6 to block openings (not shown) located in the surface of oil filler 14 (shown in FIG. 3). FIG. 8 shows external threads on the perimeter of coverplate 6 and on the inner shaft portion of knob and inner shaft unit 16 FIG. 8 also shows studs 22 being positioned on the surface of coverplate 6 contemplated for placement against oil filter 14 (shown in FIG. 3).

What is claimed is:

1. A cover in combination with a disposable oil filter having a housing, a plurality of openings extending through said housing and a plurality of internal threads on at least one of said openings for attaching said disposable oil filter to an engine, said cover comprising a cover-plate including a first surface adapted to block said openings and to prevent residual oil contained within said disposable oil filter from leaking through said openings, said cover-plate having a second surface opposite said first surface and an aperture extending through said cover-plate and said first and second surfaces, said cover also comprising a free-spinning knob extending from said aperture adjacent said second surface for a user to hold while attaching and removing said cover from said disposable oil filter, an inner shaft rigidly and non-rotatably connected to said free-spinning knob, said inner shaft including an internal portion disposed within said aperture and an external portion extending from said aperture and disposed adjacent said first surface, connection means for connecting said free-spinning knob and said inner shaft to said cover-plate, said connecting means including a circumferentially extending groove formed on an inner peripheral surface of said aperture and a flange rigidly and non-rotatable connected to the internal portion of said inner shaft, wherein said flange extends circumferentially about and radially outwardly from the internal portion of said inner shaft and extends into said groove whereby said connecting means permits rotation of said inner shaft within said aperture and substantially prevents axial displacement of said inner shaft from said aperature, and a plurality of external threads located on the external portion of said inner shaft for mating with at least some of said internal threads on said disposable oil filter so that said coverplate may be securely attached to said oil filter to prevent oil from leaking from said openings and adversely affecting the environment after disposal.

2. The combination of claim 1 further comprising studs depending from said first surface of said coverplate to block said openings and to provide additional protection against residual oil in said disposable oil filter from leaking through said opening.

* * * * *